United States Patent [19]
Johnson et al.

[11] 3,984,852
[45] Oct. 5, 1976

[54] EXPOSURE COUNTER FOR AN AUTOMATIC CAMERA

[75] Inventors: Bruce K. Johnson, Andover; David E. Van Allen, Malden, both of Mass.

[73] Assignee: Polaroid Corporation, Cambridge, Mass.

[22] Filed: Mar. 3, 1975

[21] Appl. No.: 554,764

[52] U.S. Cl. ............................... 354/217; 354/83
[51] Int. Cl.² ................... G03B 17/36; G03B 17/52
[58] Field of Search ............................ 354/83, 217

[56] References Cited
UNITED STATES PATENTS
3,750,551   8/1973   Land et al. ............................ 354/83

*Primary Examiner*—Joseph F. Peters, Jr.
*Attorney, Agent, or Firm*—Alfred E. Corrigan; Kenneth W. Anderson

[57] ABSTRACT

An exposure counter for use in a camera which provides a user with information as to the number of remaining exposures within a film cassette positioned therein. The exposure counter includes a drum or cylinder which is coupled to one member of a gear train which operates to simultaneously index the drum and actuate a film-advancing apparatus so that the drum is sequentially indexed to change a character present at a counter window in the camera while the film-advancing apparatus operates to advance an exposed film unit from within the cassette to the exterior of the camera. The camera is provided with a pawl which, when held in its operative position by the cassette, functions to allow rotation of the drum from a starting position to a terminal position while simultaneously preventing rotation of the drum back to its starting position. Upon removal of the cassette from within the camera, the pawl releases the drum thereby permitting it to be reset automatically to a starting position whereat the drum presents an appropriate character to the counter window which is subsequently changed upon the proper positioning of a new film laden cassette within the camera and for each subsequent exposure.

11 Claims, 5 Drawing Figures

EXPOSURE COUNTER FOR AN AUTOMATIC CAMERA

REFERENCE TO RELATED APPLICATION

This application is related to copending application Ser. NO. 554,765 filed on Mar. 3, 1975 herewith in the name of Joseph E. Murray, Jr. and entitled "A Switching Device For An Automatic Camera."

BACKGROUND OF THE INVENTION

1. Field of the Invention

The invention relates to the field of photography and, more particularly, to a photographic apparatus including an exposure counter for use therewith.

2. Description of the Prior Art

It is customary to provide photographic apparatus with an exposure counter so as to convey certain information to the user regarding the number of exposures which have been made or which remain in a film assemblage located within the photographic apparatus. Exposure counters generally include an indicia-bearing member having characters thereon which are sequentially presented at a viewing station, usually a window, in the apparatus for conveying this information to the user. Usually, the characters are sequentially changed by an indexing system coupled to a film advancing apparatus which in turn is manually operated by a hand crank located on the camera as shown in U.S. Pat. Nos. 2,608,922 and 2,552,275. Operation of the hand crank advances a film frame into position for exposure and simultaneously indexes the exposure counter to change the character present at the viewing station. Needless to say, manual operation of the crank leaves something to be desired. Further, many exposure counters are unduly complicated in construction and operation, and are often positioned in locations within the apparatus having limited accessibility, thereby making it more difficult to reset them to their starting position subsequent to the exposure of the last film unit or frame in the film assemblage. One solution proposed to improve the problem of resetting the exposure counter is described in U.S. Pat. No. 2,813,469, namely, an arrangement whereby opening the camera's door will automatically reset the camera's exposure counter to its starting position. However, opening the camera's door is not necessarily connected with the act of providing the camera with a fresh supply of film and therefore does not necessarily ensure that the counter will be properly oriented prior to the next exposure. For example, after one or more film units have been exposed, should the camera's door be opened for purposes of viewing the film container to ascertain if it is correctly positioned within the camera or for inspection of one of the components of the camera, such as the processing rollers in a camera of the self-developing type, the counter would be automatically reset thereby resulting in the exposure number of the counter being out of phase with the number of the next exposure.

U.S. Pat. No. 3,653,313 describes an exposure counter for use with a single-lens reflex camera which solves the problem of resetting the exposure counter by automatically resetting the camera's counter upon removal of an empty film container from within the camera. However, the exposure counter is coupled to a reflecting member or mirror and sequentially advanced in response to movement of the reflecting member between a lowered viewing position and a raised exposure position. In order to utilize the pivotal movement of the reflecting member to rotate the exposure counter, a relatively complex system including a plurality of pivotally mounted pawls and cam surfaces interact to accomplish the desired result of indexing the exposure counter as the reflecting member moves from the viewing position to the exposure position and back again. The exposure counter is automatically reset upon the removal of the empty film container from within the camera whereupon the resetting cycle is accomplished by the pawls and cam surfaces interacting in a reverse manner to release the exposure counter for rotation in a reverse direction into a starting position. Therefore, the indexing and resetting of the exposure counter is substantially dependent upon each member of the system being properly located and coupled to an adjoining member such that the previous movement of one member is sufficient to displace a second member in contact therewith, originating with the reflecting member operating to initiate movement of the counter in the indexing mode and a cantilevered spring the end of which displaces one of the pawls thereby enabling the exposure counter to reset itself in the starting position.

From the foregoing, it can be seen that there is a need for an exposure counter capable of conveying information regarding the number of exposures remaining within a camera to the user which uses fewer moving parts, is automatically reset upon the removal of an empty film container, and provides increased reliability and durability at reduced manufacturing costs.

SUMMARY OF THE INVENTION

The present invention relates to a fully automatic photographic apparatus and an exposure counter for use therewith. The photographic apparatus includes a film-advancing apparatus for removing photosensitive film units from an exposure plane of the camera subsequent to exposure to actinic radiation through a lens system and advancing the exposed film units to the exterior of the apparatus. The film-advancing apparatus is driven by a motor coupled thereto by a power train including a wheel having a pin extending from one side thereof for driving engagement with the exposure counter. The exposure counter is sequentially advanced during each revolution of the wheel whereupon a new character defining the status of the film units within the apparatus is presented at a viewing station included upon a wall of the apparatus.

The film units are arranged in stacked relationship within a cassette. The photographic apparatus includes a receiving chamber wherein a film laden cassette is inserted and positioned for presenting individual film units at the exposure plane of the photographic apparatus for exposure. The exposure counter is provided with a latching pawl pivotally mounted for movement into engagement with the exposure counter when a film laden cassette is inserted into the receiving chamber. The latching pawl permits movement of the exposure counter in a predetermined direction only during the sequential indexing of the counter. When the empty film cassette is removed from the receiving chamber, the latching pawl, in response to the removal, moves out of engagement with the exposure counter thereby allowing the latter to automatically reset itself in the starting position.

An object of the invention is to provide a simplified, highly reliable indicia bearing exposure counter for use with a photographic apparatus having a direct coupling to a member of a gear train rotatably driven by a motor whereby the exposure counter is sequentially indexed upon each revolution of the member to present a number corresponding to the remaining number of exposures within the apparatus at a viewing station of the apparatus.

Other objects of the invention will in part be obvious and will in part appear hereinafter.

The invention accordingly comprises the apparatus possessing the construction, combination of elements and arrangement of parts which are exemplified in the following disclosure and the scope of the application which will be indicated in the claims.

BRIEF DESCRIPTION OF THE DRAWINGS

For a fuller understanding of the nature and objects of the invention, reference should be made to the following detailed description taken in conjunction with the accompanying drawings wherein.

DETAILED DESCRIPTION OF THE INVENTION

Figure 1:
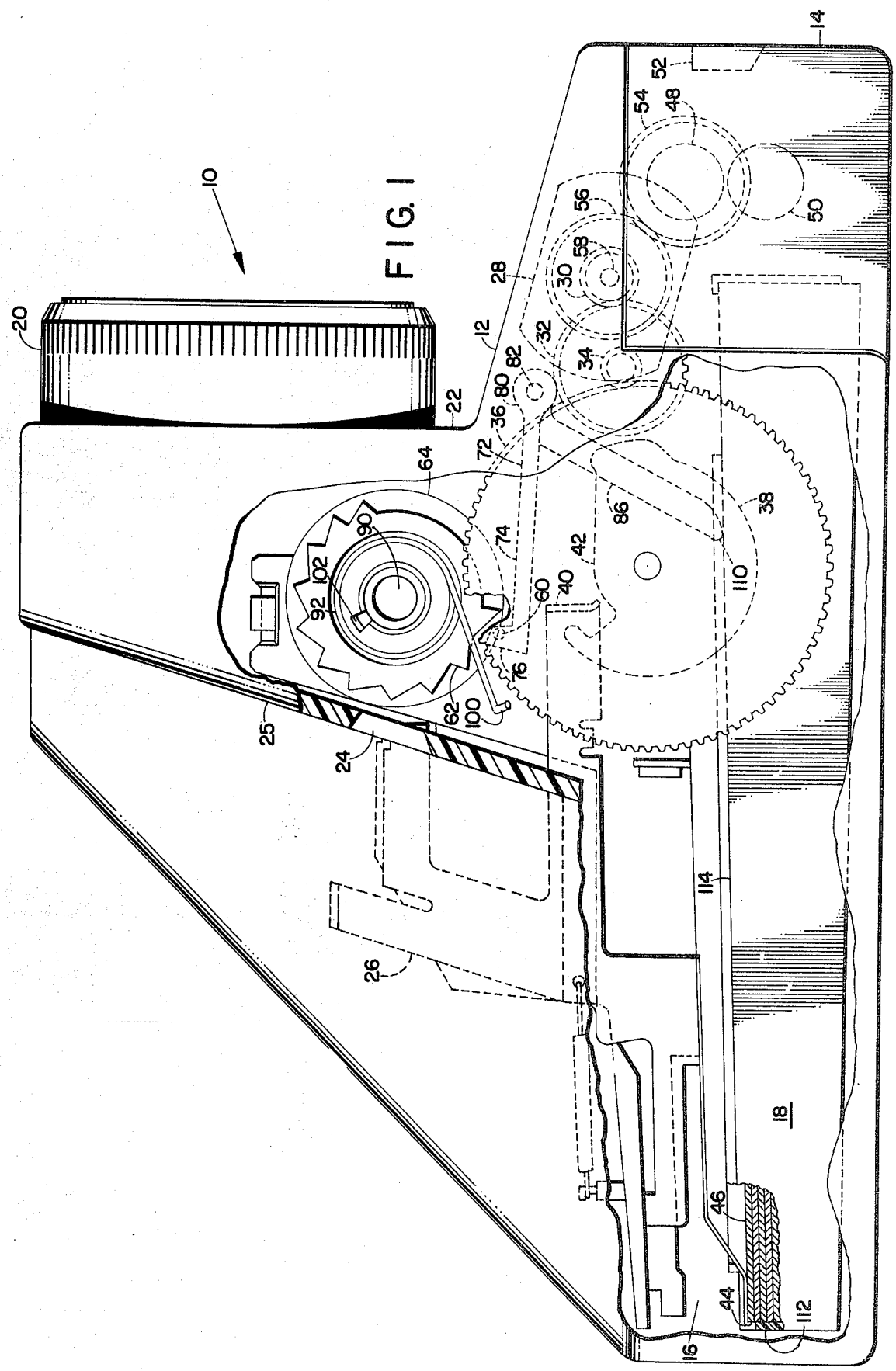
FIG. 1 is a side view, partly in section, of a photographic apparatus of a non-reflex type having a film cassette located therein.

Referring in more detail by reference characters to FIG. 1 of the drawings, a photographic apparatus of a non-reflex type camera 10 incorporating the features of the present invention is shown. Housing components of the camera 10 comprise a body section 12 coupled to a loading door 14 pivotally mounted to swing in a downward direction to expose an entrance to an exposure chamber 16 included within body section 12 for receiving a film laden cassette 18. The body section 12 includes a lens assembly 20 mounted upon a face 22 thereof and a viewing station 24 formed within a sloping wall 25 of the body section 12 opposite to the face 22. The lens assembly 20 cooperates with a shutter assembly (not shown) to define an optical path through which actinic radiation received therethrough is permitted to enter the exposure chamber 16 when the shutter assembly is released to move to an open position to define an exposure aperture.

Located within the exposure chamber 16 is a film-advancing apparatus 26 powered by a motor 28 coupled thereto by gears 30, 32, 34 and timing gear 36. A profile cam 38 is included upon one side of the timing gear 36 for engaging a cam follower 40 which rides upon a surface 42 provided therefor on the cam 38 whereby the film-advancing apparatus 26 is moved longitudinally within the body section 12 in response to the relative position of cam follower 40 upon cam 38 during the rotation of the timing gear 36. For an example of a suitable apparatus for moving the film unit 46 subsequent to exposure, reference is made to Ser. No. 554,777 filed on Mar. 3, 1975 herewith in the name of Bruce K. Johnson et al. and entitled "Photographic Apparatus With Sequencing System." The advancing apparatus 26 includes a pick device 44 formed thereon to engage a trailing edge of a photosensitive film unit 46 for advancing the film unit 46 subsequent to exposure from within the cassette 18 into the bite or point of tangency between a pair of rotatably mounted processing rollers 48 and 50 whereby the film unit 46, which may be of the type described in U.S. Pat. No. 3,415,644, is processed and advanced through an egress 52 to the exterior of the camera. Roller 48 includes a pinion 54 axially coupled thereto and in enmeshment with a gear 56, rotatably coupled to a shaft 58 for driving the rollers 48 and 50 whereby a fluid processing composition included within the film unit 46 is spread across a photosensitive surface of the film unit 46 to initiate development of an image therein, as is well known in the art.

When an exposure actuating button (not shown) included upon the face 22 of the body section 12 is depressed, an exposure cycle for the camera 10 is actuated which operates to expose the photosensitive surface of the film unit 46. The timing gear 36 is coupled to the drive gear 30 of the motor 28 through the pair of intermediate gears 32 and 34 so that when the motor is set in motion during the exposure cycle, the timing gear 36 completes one revolution gear exposure cycle. A drive pin 60 shares the side of the timing gear 36 having the profile cam 38 included thereon and operates to engage, upon each revolution, one of a plurality of teeth 62 spaced around a periphery of a first side of a cylinder 64 supporting printed indicia around an outer periphery thereof and operates to index the cylinder 64 one of the plurality of teeth 62 such that a character defining the number of remaining exposures within the camera 10 is aligned with the viewing station 24.

Figure 2:
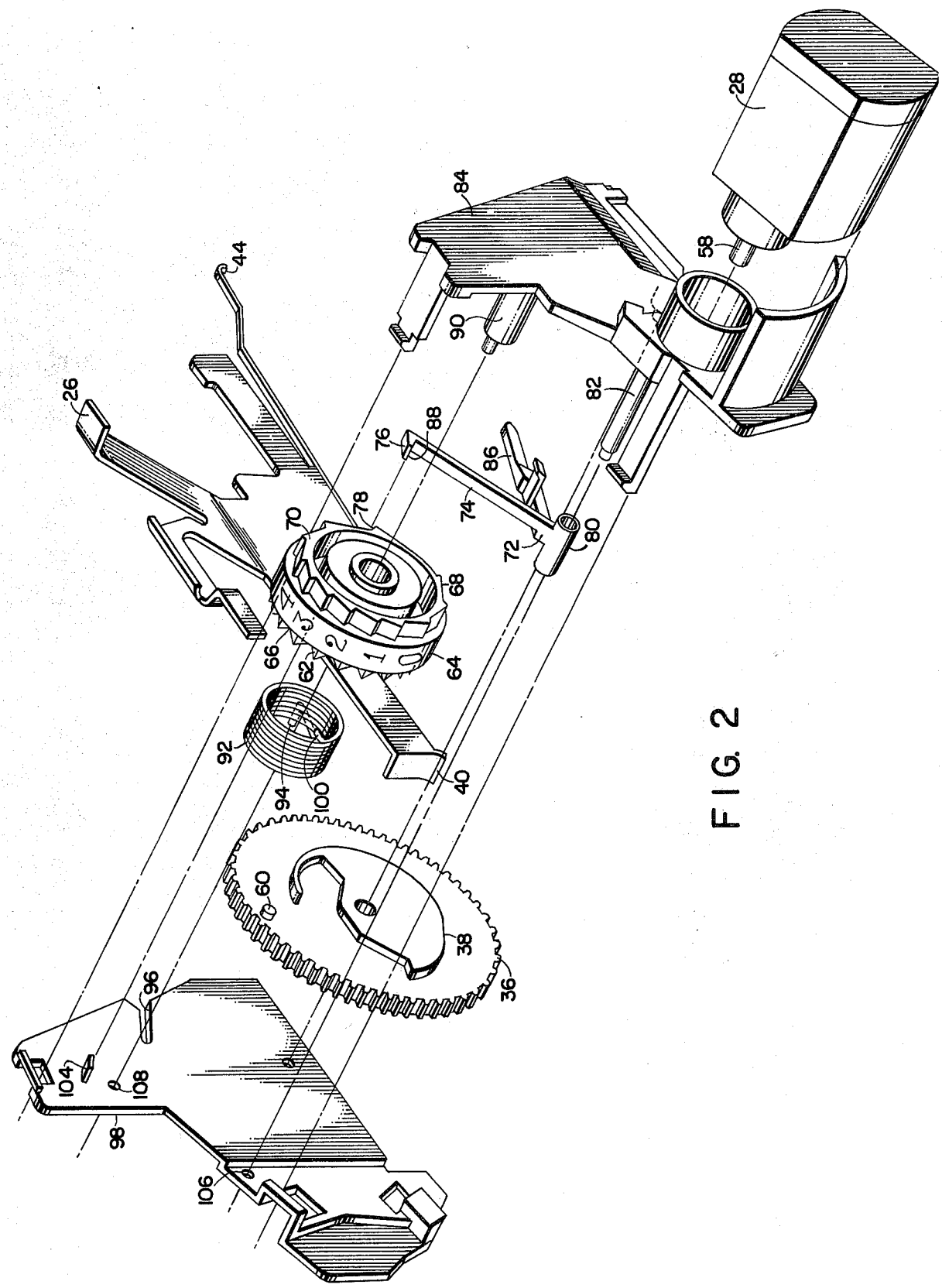
FIG. 2 is an enlarged, exploded perspective view of an exposure counter and its related structure.

The cylinder 64 is one component of an exposure counter shown in detail in FIG. 2. Extending from the cylinder 64 upon the first side thereof are a plurality of drive teeth 62 which define a drive ratchet wheel 66 fixedly secured or integrally included thereon for cooperating with the drive pin 60 in rotating the indicia bearing cylinder 64. A plurality of notches 68 are spaced around the periphery of a second side of the cylinder 64 to define a release ratchet wheel 70 fixedly secured or integrally included thereon for cooperating with a latching pawl 72. The latching pawl 72 includes a first leg 74 having a latching tip 76 formed to engage an underlying surface 78 of one of the notches 68 thereby allowing the cylinder 64 to rotate in one direction only, i.e., in the direction of the arrow shown in FIG. 5. The latching pawl 72 includes a cylindrical mounting member 80 for pivotally mounting the latching pawl 72 upon a mounting pin 82 extending rom an inner wall of a first housing frame 84. Extending from the cylindrical mounting member 80 are the first leg 74 and a second leg 86 angularly displaced from the first leg 74 in a predetermined direction such that contact therewith pivotally moves the latching pawl 72 from a first position, wherein an engagement surface 88 of the latching tip 76 is out of contact with the underlying surface 78 of the notches 68, to a second position wherein the engagement surface 88 is in substantially complete engagement with the underlying surface 78 of one of the notches 68 thereby latching the cylinder 64 in position subsequent to movement of the cylinder 64 to a new position while permitting further rotational movement of the cylinder 64 in the desired one direction.

The cylinder 64 is rotatably mounted upon a shaft 90 extending from the inner wall of the first housing frame 84 whereupon the cylinder 64 rotates when rotatably driven by the timing gear 36 in a counterclockwise direction (as viewed in FIG. 1). A rewind spring 92 has one end 94 positioned within a slot 96 in a second housing frame 98 and its other end 100 suitably secured to the cylinder 64. Spring 92 is adapted to be wound as the cylinder 64 is rotated in the counterclockwise direction for providing a source of energy for returning the cylinder 64 to its starting position, i.e., where a suitable character representing that the cassette has been removed from the camera appears at the viewing station or window 24 (see FIGS. 1 and 3) located within the wall 25 of the body section 12. Movement of the cylinder 64 in a clockwise manner during a rewind cycle is limited by a stop member 102 (shown in FIG. 4) included upon the first side of the cylinder 64 which extends therefrom to engage an interceptor 104 extending from an inner wall of second housing frame 98, i.e., the stop member 102 strikes the interceptor 104 of the second housing frame 98 as the cylinder rotates into the starting position.

First and second housing frames 84 and 98 are coupled together to protect and support the components sandwiched therebetween and apertures 106 and 108 of the second frame housing are provided to receivably secure the unsupported ends of the mounting pin 82 and the shaft 90 therein.

Figure 3:
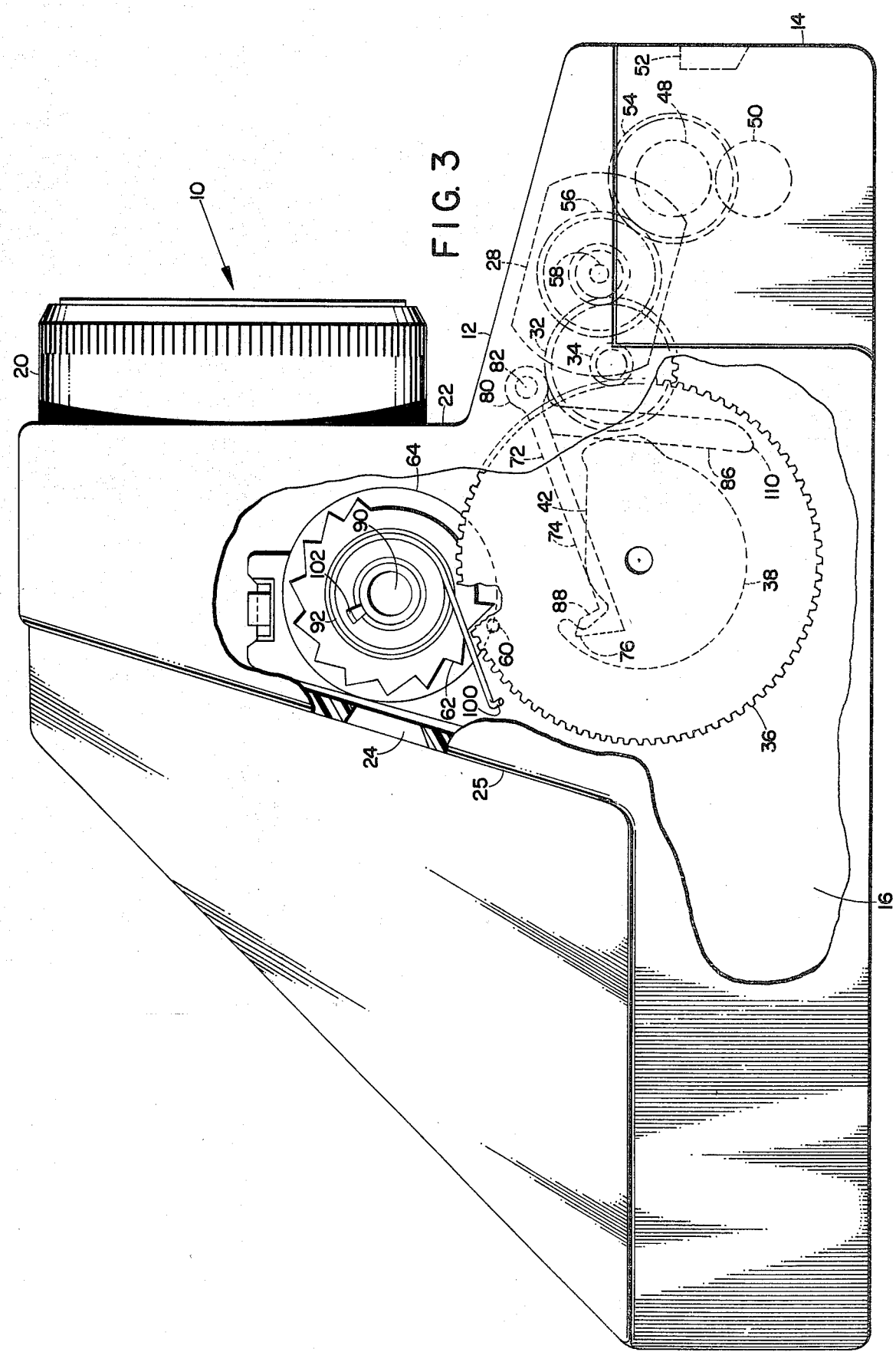
FIG. 3 is a side view, partly in section, of the photographic apparatus of FIG. 1 wherein the film cassette has been removed from the apparatus.

Prior to insertion of a film cassette 18 into the exposure chamber 16, the various parts of the camera 10 and the exposure counter assume the positions shown in FIG. 3. It will be noted that a free end 110 of the second leg 86 of the latching pawl 72 is substantially perpendicular to a plane established by the camera's base and extends into the exposure chamber 16 within the path of travel of an entering film laden cassette. The latching pawl 72 is shown in the first position previously mentioned wherein the latching tip 76 is originally disengaged from the underlying surface 78 of one of the notches 68. Insertion of a film cassette into position within the exposure chamber 16 pivotally moves the latching pawl 72 clockwise (as viewed in FIGS. 1 and 3) into the second position wherein the engagement surface 88 of the latching tip 76 is in substantially full contact with the underlying surface 78 of an appropriate one of the notches 68 of the release ratchet wheel 70 (as viewed in FIG. 5). The latching pawl 72 is pivotally moved from the first position to the second position by an advancing edge of the entering film cassette. Stated another way, when the end wall 112 of the cassette 18 strikes the free end 110 of second leg 86, the latching pawl 72 pivotally moves in a clockwise direction, as viewed in FIGS. 1 and 3, whereupon free end 110 slides upon a sloping surface of a forward wall 114 of the cassette 18 during the continued insertion of the cassette 18. Once the cassette 18 reaches its terminal position within the exposure chamber 16, engagement surface 88 of latching tip 76 is latched against the underlying surface 78 of one of the notches 68. The latching pawl 72 is retained in the second position by the forward wall 114 bearing against free end 110 of second leg 86 whereby the cylinder 64 is permitted to rotate unidirectionally, i.e., counterclockwise as viewed in FIGS. 1 and 3. During the removal of the cassette 18 from within the exposure chamber 16, free end 110 slides upon the surface of forward wall 114 until it is no longer in contact therewith, whereupon the latching pawl 72 is free to pivotally fall back into the first position wherein second leg 86 is in position within the exposure chamber 16 for contact with an entering edge of a freshly inserted cassette and latching tip 76 is out of engagement with notches 68.

When the exposure chamber 16 is empty, the cylinder 64 is in the starting position and latched therein by the contact between interceptor 104 and stop member 102. Upon loading the camera, the loading door 14 is pivotally moved downward into an open position whereby an entrance to the exposure chamber 16 is available to receive a film laden cassette. The user may now insert the film laden cassette through the entrance to the exposure chamber 16 whereby latching pawl 72 is moved into the second position wherein the latching tip 76 is in engagement with an appropriate one of the notches 68 (as viewed in FIG. 5). When the loading door is moved into the closed position as viewed in FIGS. 1 and 3, it is latched in the closed position by a latching device provided to secure the film laden cassette within the exposure chamber 16. As a function of the closure, an electrical switch (not shown), described in detail in a copending application Ser. No. 502,161, filed on Sept. 6, 1974 in the name of Andrew S. Ivester et al., signals the camera's control circuit that the exposure chamber 16 is secured. The camera's control circuit includes a switching device, described and claimed in detail in the related copending application Ser. No. 554,765 filed on Mar. 3, 1975 herewith in the name of Joseph E. Murray, Jr. and entitled "A Switching Device For An Automatic Camera," which selectively activates the film-advancing apparatus 26 automatically in response to the positioning of the film laden cassette 18 within the exposure chamber 16 and to the movement of the loading door 14 to the closed position wherein the cassette 18 is secured within the exposure chamber 16.

The automatic activation of the film-advancing apparatus 26 provides for removal of a dark slide cover included as a forwardmost member of a film assemblage included within the cassette 18 for protecting underlying photosensitive surfaces of the film units 46 stored therein whereby the dark slide is moved out of the film cassette 18 and into the bite of processing rollers 48 and 50 for subsequent movement through the egress 52 to the exterior of the camera 10. As previously stated, the film-advancing apparatus is driven by the motor 28 operating to impart rotary movement to the timing gear 36 whereupon the drive pin 60 included upon the side of the timing gear 36 drives against the surface 116 of one of a plurality of teeth 62 spaced around the periphery of the drive ratchet wheel 66 whereby the cylinder 64 is rotatably driven and indexed one tooth for each revolution of the timing gear 36. Therefore, during the dark slide removal cycle, the cylinder 64 is indexed in a counterclockwise direction and latching tip 76 rides up upon surface 118 of one of the notches 68 until it falls behind the next advancing notch whereupon engagement surface 88 is in contact with the underlying surface 78 of the next advancing notch.

The user now actuates the exposure release button (not shown) which activates a circuit included within the camera 10 to start an exposure cycle wherein the lens assembly 20 cooperates with a shutter assembly and a mirror (not shown) to define a folded optical path through which actinic radiation received through the lens assembly 20 is presented to the photosensitive surface of the forwardmost film unit 46 within the cassette. Subsequent to exposure, the motor 28 is set in motion whereupon the film-advancing apparatus 26 advances the exposed film unit from within the cassette 18 into the grasp of the processing rollers 48 and 50 whereby the exposed film unit is processed and advanced through the egress 52 to the exterior of the camera 10.

When the cylinder 64 is in the starting position, a character indicating the same appears within the viewing station or window 24. During the dark slide ejection cycle, the indicia bearing cylinder 64 is rotatably indexed one tooth whereupon a character defining the number of exposures contained within the camera 10 is aligned with the window 24. This cycle of events is repeated for every actuation of the exposure release button whereupon the timing gear 36 is rotated through one revolution thereby indexing the cylinder 64 one tooth whereupon a new character defining the number of exposures remaining within the camera 10 is aligned with the window 24. The cylinder 64 is prevented from moving in an opposite direction by the latching pawl 72 stationed in the second position and the action of the latching tip 76 riding upon surface 118 of each notch 68, while the cylinder 64 is being indexed by the engagement between the drive pin 60 and the drive teeth 62, and falling behind the next advancing notch 68 to engage its underlying surface 78 substantially prior to the break in contact between the drive pin 60 and one of the drive teeth 62.

Figure 4:
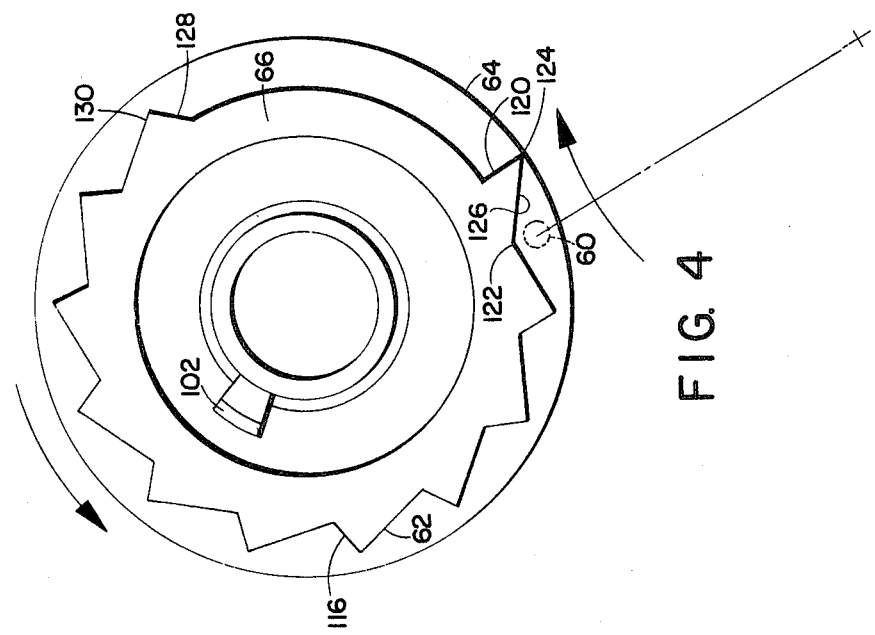
FIG. 4 is an enlarged view of a first side of one of the components of the exposure counter of FIG. 2.

In FIG. 4, the cylinder 64 is shown as viewed from the first side while in the starting position. Drive teeth 62 are spaced around the periphery of the drive ratchet wheel 66 for cooperating with the drive pin 60 to rotate or index the cylinder 64 and thereby sequentially align the proper character with the viewing station or window 24. One of the end teeth 120 is substantially greater in height, as measured from a point 122 on the root diameter for all of the drive teeth 62 to an end 124, than any of the remaining drive teeth 62 included on the drive ratchet wheel 66 and is the first tooth contacted by drive pin 60 subsequent to the rewinding of the cylinder 64 into its starting position. During the automatic removal of the opaque dark slide cover, timing gear 36 is set into motion by the operation of the motor 28 whereupon drive pin 60 moves in contact with surface 126 of end tooth 120 and drives against the surface 126 thereby imparting motion to cylinder 64 and angularly displacing the cylinder 64 at a distance sufficient to present the proper character defining the number of exposures included within the cassette to the viewing station 24. The substantially greater height of the end tooth 120 permits the drive pin 60 to remain in contact with surface 126 for a relatively greater period of time than it is with the surfaces of the remaining drive teeth 62 thereby substantially assuring that the cylinder 64 is moved out of the starting position and an operation described and claimed in the aforementioned copending application Ser. No. 554,765 has been performed. Following the automatic dark slide ejection cycle, the user now depresses the exposure release button for initiating the exposure cycle for the camera 10 during which the motor 28 is energized to drive the timing gear 36 for removing the exposed film unit to the exterior of the camera 10 and thereby indexing the cylinder 64 to register a new character within the window 24 defining the remaining number of exposures within the camera.

This cycle of events is repeated for every actuation of the exposure release button until the cylinder 64 has been indexed to a terminal or end position whereat the cassette 18 is empty and a character, e.g., "0," designating such is aligned with the window 24. Should the user depress the exposure release button at this time, the cylinder 64 will not index but instead it will remain in the terminal position as the drive pin 60 during removal of the last exposed film unit engages surface 128 of the last tooth 130 of the plurality of drive teeth 62 and thereby indexes the cylinder 64 into the terminal position wherein the drive pin 60 is beyond surface 128 and there are no remaining teeth for the drive pin to engage.

Removal of the empty cassette permits the latching pawl 72 to pivot into the first position thereby moving the latching tip 76 and its engagement surface out of contact with the underlying surface 78 of one of the notches 68 whereby the rewind spring 92 releases the energy stored therein, as a result of the indexing motion of the cylinder 64, to drive the cylinder 64 in a clockwise direction (as viewed in FIG. 4) and a counterclockwise direction (as viewed in FIG. 5), out of the terminal position under the bias of rewind spring 92 until stop member 102 included upon the first side of cylinder 64 is moved into position to contact interceptor 104 extending from the second housing frame 98 whereupon the cylinder 64 is halted at the starting position.

Figure 5:
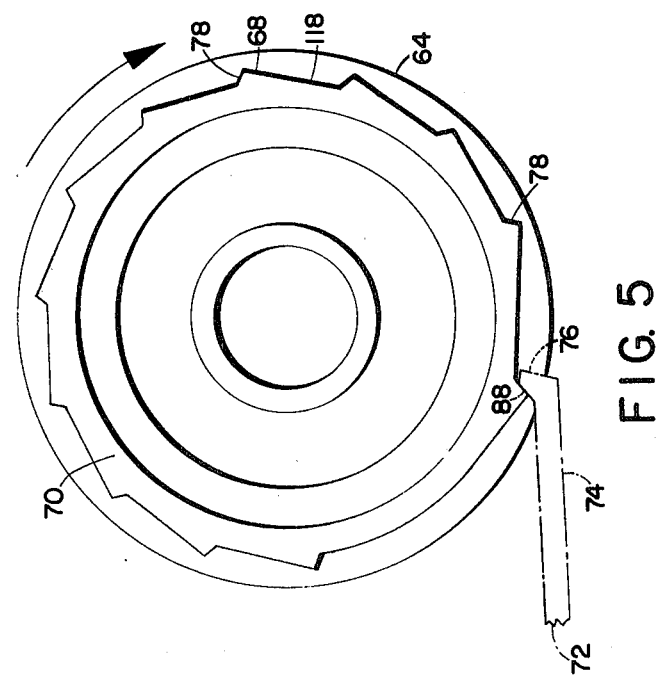
FIG. 5 is an enlarged view of a second side of the component of FIG. 3.

In FIG. 5, the cylinder 64 is shown as viewed from the second side while in the starting position. Notches 68 are spaced around the periphery of release ratchet wheel 70 for cooperating with the latching pawl 72 to prevent the cylinder from rotating in a counterclockwise direction as viewed in FIG. 5 while permitting the cylinder 64 to be indexed by the drive pin 60 in a counterclockwise direction. It is important to note that the first leg 74 and the latching pawl 72 are in the second position indicating a film cassette 18 has been received and positioned within the exposure chamber 16. The engagement between the engagement surfaces 88 with the underlying surface 78 of one of the notches 68 is typical of the method of preventing the cylinder 64 from moving out of position subsequent to being indexed into each new position.

From the foregoing it can be seen that there has been disclosed a new and unobvious arrangement of a relatively few parts for indexing an exposure counter sequentially in response to the rotational movement of a timing gear coupled to a motor for driving a film-advancing apparatus and the exposure counter. In addition, the structure includes a single device which cooperates with the counter to latch the exposure counter into each freshly arrived position during the counting mode and to release the counter for automatic resetting thereof upon removal of an empty film cassette from within an exposure chamber of the camera.

Although a specific type of non-folding, non-reflex camera has been described herein, it should be understood the present invention could be incorporated into a folding and/or reflex camera for use therein and the electrically driven motor for indexing the exposure counter replaced by a spring wound device.

The invention may be practiced or embodied in still other ways without departing from the spirit and essential character thereof. The preferred embodiment described herein is therefore to be considered illustrative and not restrictive, the scope of the invention being indicated by the appended claims and all variations which come within the meaning of the claims are intended to be embraced therein.

What is claimed is:

1. Photographic apparatus comprising:
a housing including means defining a chamber for receiving a film laden cassette at a predetermined location therein;
a viewing station included on said housing;
an exposure counter including an indicia bearing member for sequentially presenting different characters to said viewing station, said exposure counter being mounted for movement from a starting position to a terminal position;
means for indexing said exposure counter to sequentially change the character present at said viewing station, said indexing means including a gear and a means extending therefrom for periodic engagement with said exposure counter; and
means for driving said indexing means to impart rotary motion to said indexing means to move said extending means into engagement with said exposure counter to index the latter thereby changing the character present at said viewing station.

2. Photographic apparatus as defined in claim 1 wherein said exposure counter further includes spring means tensionable by operation of said indexing means for returning said exposure counter to said starting position upon removal of the cassette from within said chamber means.

3. Photographic apparatus as defined in claim 2 wherein said apparatus further includes means for monitoring said chamber means, said monitoring means being mounted for movement between first and second positions, said monitoring means operating, when in said first position, to permit said exposure counter to automatically move from said terminal position to said starting position under the bias of said spring means, and when in said second position to prevent said spring means from operating to return said exposure counter to said starting position prior to removal of the cassette from within said chamber means.

4. Photographic apparatus as defined in claim 3 wherein said exposure counter further comprises:
a drive ratchet wheel included upon a first side thereof and being periodically engageable by said extending means for sequentially changing the character present at said viewing station upon each revolution of said indexing means; and
a release ratchet wheel included upon a second side of said exposure counter, said release ratchet wheel being engageable by said monitoring means when said monitoring means is moved into said second position and disengaged therefrom when said monitoring means is returned to said first position upon removal of the cassette whereby said spring means returns said exposure counter to said starting position.

5. Photographic apparatus as defined in claim 4 wherein said exposure counter includes means for preventing advancement of said exposure counter beyond said starting position when said spring means returns said exposure counter to said starting position.

6. Photographic apparatus as defined in claim 1 wherein said exposure counter comprises a cylinder having a face, said face of said cylinder including a graduated dial having identifying characters thereon that are sequentially presented at said viewing station upon each revolution of said indexing means.

7. Photographic apparatus as defined in claim 1 wherein said drive means includes:
motor means; and
a power train coupled to said motor means for transferring energy from said motor means to said indexing means.

8. Photographic apparatus as defined in claim 3 further including means for pivotally mounting said monitoring means between said first and second positions and said monitoring means includes a first leg having an end configured to engage said release ratches wheel and a second let angularly spaced from said first leg to extend into said chamber means for engaging a surface of a cassette inserted into said chamber means whereby insertion of a cassette into said chamber pivotally moves said second leg thereby moving said monitoring means from said first position to said second position and upon removal of the cassette pivotally moves said monitoring means out of said second position and into said first position.

9. Photographic apparatus as defined in claim 1 wherein said apparatus further includes a film-advancing apparatus for removing an exposed film unit from within the cassette.

10. Photographic apparatus as defined in claim 9 wherein said indexing means further includes means for engaging and actuating said film-advancing apparatus to move a film unit from said cassette.

11. Photographic apparatus comprising:
a housing including means defining a chamber for removably receiving a film laden cassette at a predetermined location therein;
a viewing station included on said housing;
an exposure counter mounted within said housing above said chamber means comprising a cylinder having a plurality of characters thereon and integrally including on a first side thereof a drive ratchet member and on a second side thereof a release ratchet member, said cylinder being aligned with said viewing station so as to sequentially change the character presented to said viewing station;
drive means rotatably mounted along side said chamber means, said drive means including means for engaging said drive ratchet member upon one side, said drive means being actuatable for advancing said exposure counter from a starting position to a terminal position thereby sequentially changing the character present at said viewing station;
a latching member integrally including means for engaging said release ratchet member and means for contact with the film laden cassette, said latching member being mounted in position to be engaged by a cassette being positioned within said chamber means for moving said latching member from a first position, wherein said engaging means is out of engagement with said release ratchet member, into a second position wherein said engaging means is in engagement with said release ratchet member whereby said exposure counter may be advanced by said drive means in the direction of said terminal position only; and
spring means tensionable by operation of said drive means when said contact means is in said second position for returning said exposure counter to said starting position when said latching member is moved from the second position to the first position upon removal of the cassette from within said chamber means.

* * * * *